United States Patent

[11] 3,589,813

| [72] | Inventor | Oskar Edwin Sturzinger<br>Kirchwattweg 6, Baar, Zug, Switzerland |
|---|---|---|
| [21] | Appl. No. | 695,995 |
| [22] | Filed | Jan. 5, 1968 |
| [45] | Patented | June 29, 1971 |
| [32] | Priority | Jan. 11, 1967 |
| [33] | | Switzerland |
| [31] | | 453/67 |

[54] DETECTOR MEANS FOR PULVERULENT, GRANULAR OR FLAKY MATERIAL
4 Claims, 2 Drawing Figs.

[52] U.S. Cl. .................................................. 356/72,
73/170, 73/171, 250/201, 250/218, 250/222, 356/103, 356/244
[51] Int. Cl. ................................................... G01n 21/00, G01n 15/02, G01n 21/11
[50] Field of Search ........................................... 356/102—104, 207—208, 244; 250/218, 201, 222; 73/170, 171

[56] References Cited
UNITED STATES PATENTS

| 2,076,553 | 4/1937 | Drinker et al. | 250/222 (M) |
| 2,604,809 | 7/1952 | Mitchell | 250/222 X |
| 3,065,665 | 11/1962 | Akhtar et al | 356/103 X |
| 3,393,602 | 7/1968 | Stouffer | 356/186 X |
| 2,076,554 | 4/1937 | Drinker et al | 250/222 (M) |

Primary Examiner—Ronald L. Wibert
Assistant Examiner—Warren A. Sklar
Attorney—Anderson, Luedeka, Fitch, Even & Tabin ABSTRACT: A detector means for loose, flowable bulk material, such as pulverulent, granular, or flaky material, and particularly snow, comprises a surface on which such material is accumulating, a light projector emitting a beam of light and projecting the beam onto the bulk material accumulating on said surface, said bulk material reflecting the light impinging thereon as highly diffused light, and a photoelectric cell is arranged to receive said reflected diffused light, whereby a signal will be emitted by said cell when a certain amount of material has accumulated on the surface. The surface on which the material accumulates is made to optically contrast from the accumulating material, so as to provide for a marked difference in the amount of diffused light projected by the surface without accumulated material thereon, as compared with the amount of diffused light reflected by the accumulated material on the surface.

PATENTED JUN 29 1971          3,589,813

INVENTOR.
OSKAR EDWIN STÜRZINGER
BY
Anderson, Luedeka, Fitch, Even, & Tabin

DETECTOR MEANS FOR PULVERULENT, GRANULAR OR FLAKY MATERIAL

This invention relates to detector means for loose, flowable bulk material, such as pulverulent, granular or flaky material, for example snow, which detector means provides a possibility of measuring the accumulating bulk material.

Today's highly civilized life is extremely dependent on land and air traffic. In countries or regions having frequent snowfall, the quick and reliable removal of snow is a problem which interests all traffic responsible people.

The timely recognition of a beginning snowfall or blizzard and the evaluation of its duration could barely be effected in reliable manner until now.

The present invention has as its object to provide detector means permitting to timely announce and evaluate any snowfall which is of some significance.

The detector means according to the invention comprises a light projector adapted to emit a beam of light for illumination of said accumulating bulk material, said beam of light illuminating the bulk material being reflected thereby in diffused form, and a photoelectric cell positioned to receive said reflected diffused light.

Besides the use of the detector means according to the invention for the purposes mentioned above, such means also may be useful as equipment for scientific purposes, for example for meteorology, as it enables precise measurings to be effected of precipitations in the form of snow or also hail.

The invention is based on the fact that a beam of light rays impinging on bulk material of the mentioned kind, for example snow, is reflected in highly diffused form.

In the following, an example of an embodiment of the invention will be explained by reference to the accompanying drawing.

Figure 1:
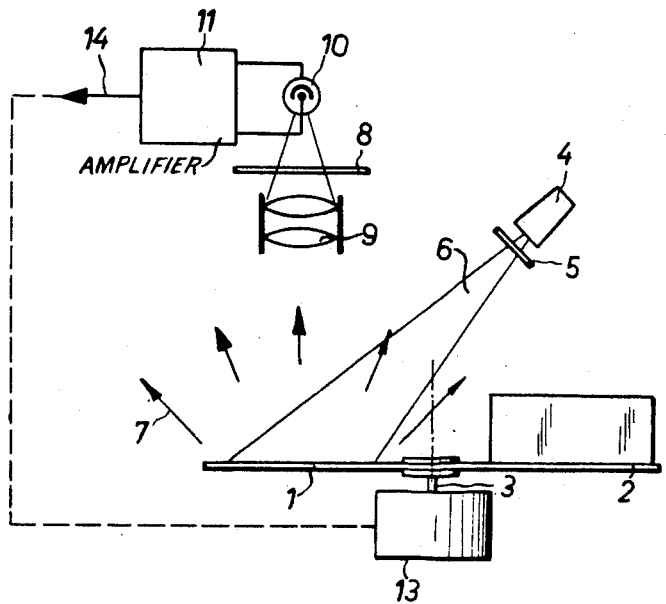
FIG. 1 is a diagrammatic representation of the detector means in elevation.
Figure 2:
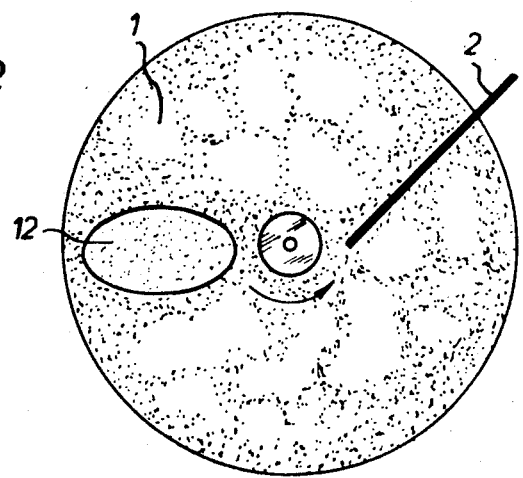
FIG. 2 is a plan vie of a portion of the detector means.

In the drawings, the reference numeral 1 designates a surface which is exposed to the accumulating bulk material, for example to snowfall. When the detector is used to supervise a section of highway or a bridge which are to be heated during snowfall, the surface 1 will represent a portion of this highway or bridge section. When snow begins to fall, the detector will put in service a heating device, as will be described later. When the accumulated snow has been melted, this fact also is indicated by the detector (absence of snow) and the heating device will remain in operation by means of separate control means (thermostats, hygrostats, time switches etc.) for a period of time required to dry the supervised section of a highway or bridge.

When the detector is used only for measuring the snowfall for statistical purposes, the surface 1 may form a platform mounted for rotation about the axis of a shaft 3; a motor and gear 13 will be provided for effecting such rotation. A scraper or wiper 2 is provided to cooperate with the top face of the platform 1 and to successively strip off the snow accumulated during one revolution of the platform. The surface 1 could also be formed by the surface of a cone or of a cylinder.

A light projector 4 is arranged above the surface 1 and adapted to emit a beam 6 of steady or modulated light. The latter can be produced for example by feeding alternating current to an electric bulb. It is also possible to use a conventional laser system. The beam of light 6 of the projector 4 is projected across a colored filter 5 on the surface 1 and there produces a light spot 12.

The surface 1 is made of a material or is colored so as to optically contrast as much as possible with respect to the bulk material intended to accumulate on the surface, so that the surface alone, without accumulated material thereon practically will reflect no light when the surface is destined to accumulate snow, but when for example dark-colored bulk material is to be collected on the surface, this latter will be made to reflect practically all the light projected thereon before bulk material accumulates on the surface. When now the bulk material such as snow accumulates on the surface, diffused light 7 will be reflected from the covered surface as soon as the layer of snow reaches a certain density and this light reflection will attain its maximum when the surface 1 is fully covered by snow.

By means of an optical system 9 the diffused reflected light is concentrated to a photoelectric cell 10 by the intermediary of a filter 8 which preferably is colored in the same manner as the filter 5. The photoelectric cell 10 to which is associated an amplifier 11 emits a signal at an outlet line 14 in known manner. The magnitude of this signal is proportional to the quantity of reflected light and accordingly of the density of the accumulated snow. The color filters 5 and 8 serve to attenuate interference of surrounding light and also to intensify the contrast between the surface 1 and the accumulated snow. When a laser is used as light source the filter 5 obviously is omitted. The modulation of the light is necessary when very intensive surrounding stray light is present. In this case, the amplifier 11 will respond only to alternating voltages, but not to stray light interference.

The motor 13 is preferably a variable-speed motor which is controlled by the amplitude of the signal from the output line 14 which adjusts an associated, conventional speed-regulating device (not shown) for the motor 13. As stated above, this output signal 14 is practically proportional to the accumulation of snow per unit time on the supporting surface 1 and the speed of the motor is adjusted to maintain the output signal on the output line 14 at a substantially constant value. Therefore, when the snowfall is very light the amplitude of the signal due to reflected light and on the output line 14 is significantly and proportionately less than the amplitude of a signal on the output line 14 when the snowfall is heavier and the reflected light is greater. To keep the signal on the line 14 substantially constant for a light or heavy snowfall it is then necessary to adjust the motor speed. Hence, when a light snowfall is occurring, the motor is being rotated at a relatively slow speed to cause the signals on the output line to be maintained at the desired predetermined value. Whereas to achieve the same substantially predetermined value for a much heavier snowfall, the number of revolutions of the motor is increased substantially. During a change in the rate of accumulation of snowfall, the speed of the motor 13 correspondingly changes to keep the output signal on the line 14 at a constant value. Stated differently, the speed of the motor turning is regulated so that the amount of light reflected by the accumulation of the surface 1 remains substantially constant so that the output on the line 14 remains substantially constant. Thus, the number of revolutions of the motor 13 per unit provides a measurement of the amount of snowfall per unit of time.

The measuring of the rate of accumulation of snowfall may be useful for controlling other systems such as an alarm system for a highway maintenance squad responsible for snow removal. For example, the alarm system for the maintenance squad may be activated only when the signal emitted by the photocell rises above a predetermined threshold value corresponding to a certain density of snowfall which is correlated to the number of revolutions of the motor 13 per unit time.

The total height of snowfall during a desired period of time can then be calculated by a simple integration. The described detector obviously will have to be placed so as to be sheltered from wind and care must be taken that no obstacles are present vertically above the surface 1 to be observed. Since the detector operates with diffused light, this requirement can be realized without difficulties.

Further applications of the invention may be found in the textile industry where flake-shaped textile products are to be evaluated for measuring purposes. Until now such measurings have been effected electrically by capacity operated means. The described detector forms a novel means for such uses. It has to be mentioned that the surface 1 as such in certain cases will not form the direct carrier of the material to be measured.

It is possible, for example, to provide a loose band of textile fibers which will be freely suspended between two processing stations. Such an expedient can be used without else for effecting an optical measurement as described before; the background, according to the particular case, may be formed by the floor of the workshop or by a machine part. It is only important to have a market optical contrast between bulk material and background, which contrast, as already described, will be obtained by an appropriate selection of the color filters 5 and 8.

Further applications of the invention may be found in the processing of grain, and generally in handling pulverulent, granular or flaky bulk material when an evaluation of such material for measuring purposes is to be effected.

I claim:

1. Detector means for ascertaining the accumulation of pulverulent, granular or flaky bulk material, comprising a light projector adapted to emit a beam of light for illuminating said accumulation of bulk material, said beam of light illuminating the bulk material being reflected thereby in diffused form, means including a photoelectric cell positioned to receive said reflected diffused light and providing an output signal representative of a measurement of said accumulation, a revolving accumulation surface having a face for receiving the bulk material, said revolving accumulation surface being optically contrasting to said bulk material and traversing the beam of light emitted by said light projector, and a wiper means coacting with said revolving accumulation surface at a location following the place of impingement of said beam of light in the direction of movement of the revolving accumulation surface, said wiper means operating to remove the accumulated bulk material from the revolving accumulation surface.

2. Detector means according to claim 1, in which said revolving accumulation surface is rotatably driven by a motor having its number of revolutions controlled in dependence of the output signal of said photoelectric cell, whereby the number of revolutions of the motor forms a means for determination of the rate of accumulation of the bulk material on said revolving accumulation surface.

3. Detector means according to claim 1, in which said light projector is arranged to emit a predetermined kind of light, and said photoelectric cell is sensibilized to respond only to said predetermined kind of light emitted by the light projector.

4. Detector means according to claim 1, in which at least one color filter is arranged between the light projector and the photoelectric cell.